May 16, 1961 S. ZADNÍČEK 2,984,792

HIGH EFFICIENCY DIRECT-CURRENT AMPLIFIER

Filed Dec. 9, 1958

INVENTOR.
Stanislav Zadníček
BY
Richard Low agt

United States Patent Office 2,984,792

Patented May 16, 1961

2,984,792

HIGH EFFICIENCY DIRECT-CURRENT AMPLIFIER

Stanislav Zadníček, Prague, Czechoslovakia, assignor to Tesla, narodni podnik, Prague, Czechoslovakia Filed Dec. 9, 1958, Ser. No. 779,211

3 Claims. (Cl. 330—10)

The present invention relates to amplifying arrangements and more particularly to a high-efficiency direct-current amplifier which comprises means for converting input signals to width-modulated pulses, a multi-electrode tube, a diode, an inductor, a load impedance, and a load bypass capacitor.

Known direct-current amplifiers are characterized by a variable efficiency, which depends on the instantaneous value of excitation thereof. Within a certain range of excitations the efficiency of D.C. amplifiers drops to very low values, thus making this kind of amplifier unsuitable for inclusion in equipments in which the problem of power economy is of major importance and where, due to the low efficiency of conventional D.C. amplifiers, large and expensive tubes would have to be used. Another drawback of present direct-current amplifiers resides in the fact that their stages are either directly coupled or coupled by means of voltage stabilisers. Both these coupling means require a complicated arrangement of power sources and their stability is in fact rather poor. The disadvantage of low efficiency is also inherent in amplifiers in which the input signal, either a D.C. or an alternating voltage whose upper frequency limit is $f_{max}$, modulates a carrier of a much higher frequency than $f_{max}$, the modulated carrier then being amplified in a linear A.C. amplifier to the required level and finally detected.

It is the object of the present invention to eliminate the drawbacks inherent in existing D.C. amplifiers. The direct-current amplifier to which this invention relates first transforms input signals to width-modulated pulses, by any known means. The width of the pulses varies in accordance with the input signals, the recurrence frequency of the pulses remaining constant. The main stage of the amplifier comprises a multi-electrode tube which is excited by the width-modulated pulses. One of the anode and cathode electrodes of the multi-electrode tube is directly connected to the corresponding electrode of a diode. (In other words, either the cathode of the multi-electrode tube is directly connected to the cathode of the diode or, alternatively, the anode of the multi-electrode tube is directly connected to the anode of the diode.) The other of the anode and cathode electrodes of the multi-electrode tube is connected to a positive source of potential and, by means of a series circuit including a bypass capacitor and a load impedance, to the other electrode of the diode. Further, an inductor is connected between the noted direct connection and a circuit point between the capacitor and the load impedance.

Figures 1, 3:
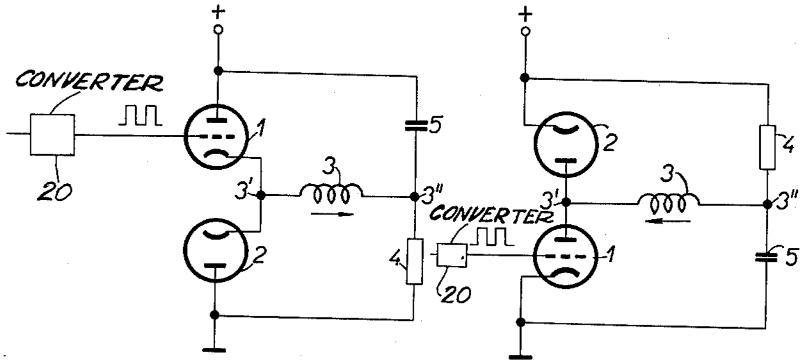
Figure 2:
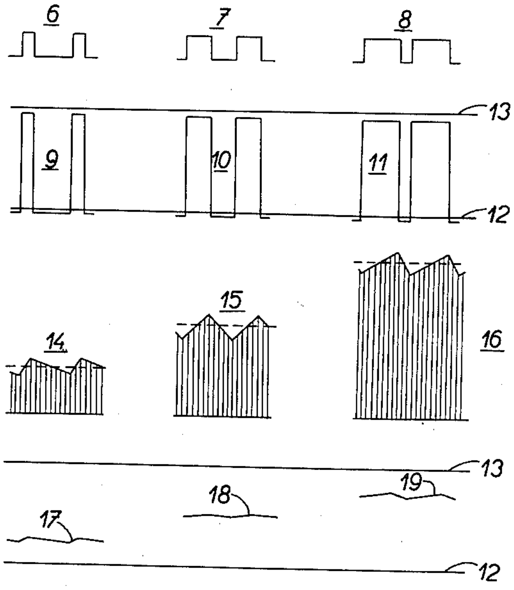

The function of the objects, features and advantages of direct-current amplifiers made in accordance with the principles of the present invention may best be understood by reference to the following detailed descrpition of illustrative embodiments thereof presented hereinbelow with reference to the accompanying drawing, in which Fig. 1 shows the circuit diagram of a specific illustrative direct-current amplifier embodying the principles of this invention, Fig. 2 illustrates the wave-forms of voltages and currents at various points of the amplifier circuit of Fig. 1, Fig. 3 is a circuit diagram of another illustrative direct-current amplifier embodying the principles of the present invention, in which amplifier the cathode of the multi-electrode tube is grounded.

Referring to Fig. 1, there is shown a direct-current amplifier including a multi-electrode tube 1 to the control grid of which are applied width-modulated pulses. The plate electrode of the tube 1 is connected to a source of positive potential and, by means of a bypass capacitor 5, to a circuit points 3″ which in turn is connected through a load impedance 4 to the plate of a diode 2. Also, the point 3″ is connected through an inductor 3 to a circuit point 3′, which is a point on a direct connection between the cathode of the tube 1 and the cathode of the tube 2. The plate of the tube 2 is grounded and so is the more negative terminal of the aforementioned positive source.

The amplifier operates in the following way:

The input voltage, consisting of a D.C. component and of various alternating voltages whose highest frequency is $f_{max}$, is first transformed to width-modulated pulses by any of the well known means therefor. The recurrence frequency of the pulses is assumed to be considerably higher than $f_{max}$. Each of the incoming width-modulated pulses causes the tube 1 to conduct and each time the tube conducts, the voltage on its cathode rises to a value which is very close to the voltage of the source. As the tube begins to conduct the initial current flowing through it is equal to the current passing through the inductor 3 at the end of the foregoing cycle of operation. Following the application of the pulse the current flowing through the tube 1 increases and the rate of its increase corresponds to the potential difference between the points 3′ and 3″ and to the inductance of the inductor 3. The voltage at the point 3″ remains approximately steady, since the smoothing or bypass capacitor 5 is designed in relation to the recurrence frequency of incoming pulses to achieve such a condition. After the lapse of each incoming pulse the tube 1 cuts off and the potential at the about 3′ sinks to a slightly negative value, causing a current to flow through the diode 2, which is just equal to the current in the tube 1 at the end of the pulse. The current in diode 2 then decreases during the pause between successive pulses, the rate of decrease corresponding to the voltage drop between the points 3″ and 3′. The steady state is characterized by equal wave-forms of currents flowing in the system within each period of two subsequent pulses. This state is attainable by establishing a predetermined relation between the width of control pulses and the potential at the point 3″. The absolute value of average currents is automatically set in such a manner that Ohm's law is fulfilled for the load, which, in Fig. 1, is represented by a resistance 4.

Note that a converter 20 is connected to the control grid of each of the multi-electrode tubes 1 of Figs. 1 and 3. The element 20 converts input signals to width-modulated pulses.

Fig. 2 shows the wave-forms of voltages and currents at various points of the amplifier circuit. Various pulse shapes, applied to the control grid of the tube 1, are denoted 6, 7 and 8. Each pair of pulses corresponds to a different width-modulation factor i.e., to a different input voltage. The voltages at point 3′, which correspond to the series of pulses 6, 7 and 8, are denoted 9, 10 and 11. The line 12 represents a zero or ground voltage level, while the line 13 corresponds to the voltage of the source. The wave-forms 14, 15 and 16 represent the currents flowing through the inductor 3 in the direction of the arrow (see Fig. 1). The average currents are illustrated by dotted lines. The curves 17, 18 and 19 shows the corresponding voltages at the point 3″, i.e. the voltages applied to the load. The respective voltage curves are shown intermediate the zero voltage line 12 and the voltage of the source (line 13).

The circuit shown in Fig. 1 is exceptionally well-suited for anode modulation of transmitters operating with a fluctuating carrier. The circuit also finds application in instances where a D.C. voltage is required and where a very quick regulation of output voltage is of prime importance.

In circuits in which the dead point of the load is allowed to be connected to the positive pole of the source, the circuit arrangement shown in Fig. 3 may preferably be used. The advantage of this amplifier circuit, when compared with that shown in Fig. 1, consists in that the cathode of the tube, which is controlled by the incoming pulses, is grounded, and the excitation of the tube is easier. The amplifier operates in a similar way as that shown in Fig. 1.

As already stated above, an amplifier circuit made in accordance with the principles of the present invention is characterized by a high effieciency. Furthermore, such a circuit shows other favorable features, e.g. very low internal resistance and the possibility of transforming almost the entire voltage of the source into the output voltage of the amplifier. As may be apparent from the foregoing description, nearly the entire energy accumulated in the inductor 3 during each pulse is delivered to the load within the interval between two subsequent pulses, which means that the amplifier operates with an extremely low energy fluctuation.

What I claim is:

1. In combination in a high-efficiency direct-current amplifier arrangement for receiving an input signal and providing an amplified direct-current representation thereof, means for converting the input signal to width-modulated pulses, tube means comprising a control grid imput electrode connected to the output of said converting means, said tube means further comprising a cathode electrode and an anode electrode, diode means comprising a cathode electrode and an anode electrode, electrical path means directly interconnecting one of said cathode and anode electrodes of said tube means and the corresponding one electrode of said diode means, a source of potential having two terminals, the other one of said cathode and anode electrodes of said tube means and the corresponding other electrode of said diode means being respectively directly connected to said terminals, inductor means having two terminals, one terminal of said inductor means being connected to said electrical path means, load means connected between the other electrode of said diode means and the other terminal of said inductor means, and capacitor means having two terminals, one terminal of said capacitor means being connected between the other one of said cathode and anode electrodes of said tube means and the other terminal of said inductor means.

2. A high-efficiency direct-current amplifier arrangement for receiving an input signal and providing an amplified direct-current representation thereof, said arrangement comprising means for converting the input signal to width-modulated pulses, tube means having a control grid input electrode connected to the output of said converting means, said tube means further including a cathode electrode and an anode electrode, diode means having cathode and anode electrodes, electrical path means directly interconnecting said cathode electrodes, source means having positive and negative terminals, said anode electrodes of said tube and diode means being respectively directly connected to said positive and negative terminals, inductor means having two terminals, one terminal of said inductor means being connected to said electrical path means, capacitor means connected between said anode electrode of said tube means and the other terminal of said inductor means, and load means connected between said anode electrode of said diode means and the other terminal of said inductor means.

3. A high-efficiency direct-current amplifier arrangement for receiving an input signal and providing an amplified direct-current representation thereof, said arrangement comprising means for converting the input signal to width-modulated pulses, tube means having a control grid input electrode connected to the output of said converting means, said tube means further including a cathode electrode and an anode electrode, electrical path means directly interconnecting said anode electrodes, source means having positive and negative terminals, said cathode electrodes of said tube and diode means being respectively directly connected to said negative and positive terminals, inductor means having two terminals, one terminal of said inductor means being connected to said electrical path means, capacitor means connected between said cathode electrode of said tube means and the other terminal of said inductor means, and load means connected between said cathode electrode of said diode means and the other terminal of said inductor means.

References Cited in the file of this patent

UNITED STATES PATENTS

| | | |
|---|---|---|
| 2,273,193 | Heising | Feb. 17, 1942 |
| 2,500,756 | Kerns | Mar. 14, 1950 |
| 2,535,912 | Frank et al. | Dec. 26, 1950 |
| 2,841,649 | Boisvieux | July 1, 1958 |